(12) United States Patent
Liu et al.

(10) Patent No.: US 11,873,366 B2
(45) Date of Patent: Jan. 16, 2024

(54) TACKIFIER FOR ELASTOMER COMPOUNDS

(71) Applicant: Rain Carbon Germany GmbH, Castrop-Rauxel (DE)

(72) Inventors: Jun Liu, Duesseldorf (DE); Marian Rauser, Moers (DE)

(73) Assignee: Rain Carbon Germany GmbH, Castrop-Rauxel (DE)

( * ) Notice: Subject to any disclaimer, the term of this patent is extended or adjusted under 35 U.S.C. 154(b) by 0 days.

(21) Appl. No.: 17/797,919

(22) PCT Filed: Feb. 8, 2021

(86) PCT No.: PCT/EP2021/052968
§ 371 (c)(1),
(2) Date: Aug. 5, 2022

(87) PCT Pub. No.: WO2021/156507
PCT Pub. Date: Aug. 12, 2021

(65) Prior Publication Data
US 2023/0095190 A1    Mar. 30, 2023

(30) Foreign Application Priority Data
Feb. 7, 2020  (EP) ..................... 20156034

(51) Int. Cl.
*C08G 61/10*  (2006.01)

(52) U.S. Cl.
CPC ..... *C08G 61/10* (2013.01); *C08G 2261/1422* (2013.01); *C08G 2261/1646* (2013.01); *C08G 2261/312* (2013.01)

(58) Field of Classification Search
CPC ............ C08G 61/10; C08G 2261/1422; C08G 2261/1646; C08G 2261/312
See application file for complete search history.

(56) References Cited

U.S. PATENT DOCUMENTS

| | | |
|---|---|---|
| 3,004,953 A | 10/1961 | Sonnabend |
| 3,239,495 A | 3/1966 | Small et al. |
| 3,976,606 A | 8/1976 | Gobran |
| 3,996,198 A * | 12/1976 | Wang .................... C08L 101/00 528/205 |
| 3,996,199 A | 12/1976 | Weinshenker et al. |
| 4,039,724 A | 8/1977 | Gobran |
| 4,071,676 A | 1/1978 | Werner et al. |
| 4,324,710 A | 4/1982 | Davis et al. |
| 4,384,096 A | 5/1983 | Sonnabend |
| 4,403,088 A | 9/1983 | Smith et al. |
| 4,764,571 A | 8/1988 | Namba et al. |
| 4,824,928 A | 4/1989 | Terrill et al. |
| 4,889,891 A | 12/1989 | Durairaj et al. |
| 5,270,403 A * | 12/1993 | Mori .................... C08F 283/10 528/96 |
| 5,674,970 A | 10/1997 | Hutchings et al. |
| 5,739,259 A * | 4/1998 | Hutchings ............. C08G 61/02 568/717 |
| 9,868,852 B2 | 1/2018 | Nakajima |
| 10,538,648 B2 | 1/2020 | Sung et al. |
| 2004/0158003 A1 | 8/2004 | Ruckel et al. |

FOREIGN PATENT DOCUMENTS

| | | |
|---|---|---|
| CN | 1196069 A | 10/1998 |
| CN | 103881305 A | 6/2014 |
| CN | 106832474 A | 6/2017 |
| DE | 2450590 A1 | 4/1975 |
| DE | 3138180 A1 | 4/1983 |
| EP | 0049402 A1 | 4/1982 |
| GB | 948201 A | 1/1964 |
| GB | 1498756 A | 1/1978 |
| JP | H028214 A | 1/1990 |
| JP | H6248021 A | 9/1994 |
| JP | H9124776 A | 5/1997 |
| JP | 6691142 B2 | 4/2020 |
| KR | 1020190024827 A | 3/2019 |
| WO | 2019045504 A1 | 3/2019 |
| WO | 2021052968 A1 | 3/2021 |

OTHER PUBLICATIONS

Freudenberg et al., "Die Lignane Des Fichtenholzes", Chemische Berichte, Jan. 1957, pp. 2857-2869, vol. 90.

* cited by examiner

*Primary Examiner* — Shane Fang
(74) *Attorney, Agent, or Firm* — The Webb Law Firm

(57) ABSTRACT

A low molar mass polymeric hydrocarbon tackifier having a number average molar mass Mn of from 200 to 1,500 g/mol provides increased green tack stability over an extended period of time in rubber compounds.

14 Claims, No Drawings

TACKIFIER FOR ELASTOMER COMPOUNDS

CROSS-REFERENCE TO RELATED APPLICATIONS

This application is the United States national phase of International Application No. PCT/EP2021/052968 filed Feb. 8, 2021, and claims priority to European Patent Application No. 20156034.9 filed Feb. 7, 2020, the disclosures of which are hereby incorporated by reference in their entirety.

BACKGROUND OF THE INVENTION

Field of the Invention

The invention relates to modified tackifiers with extended green tack properties in rubber compounds and the use of said tackifiers in the manufacture of tires and other synthetic rubber materials.

Description of Related Art

Modern radial and bias/belted passenger car tires are designed to provide good crack and abrasion resistance, low hysteresis, low rolling resistance, and good mileage as well as long service life. In order to achieve this, tire industries employ blends of styrene-butadiene (SBR) and butadiene (BR) rubber in the rubber formulations, particularly in tread and under tread compounds. Generally, natural rubber has sufficient inherent tack for most applications so that tackifying agents may not be necessary. Styrene-butadiene (SBR) has a relatively low polarity compared to other synthetic rubbers; unlike natural rubber, SBR does not develop surface peroxidal activity upon mastication. Therefore, SBR has relatively poor inherent or processed tack.

The need for improved rubber tack is probably most apparent in the tire industry. Tires are typically constructed by applying layers of rubber-coated fabric on to another, followed by a breaker strip, cushion, and tread. The layers must possess sufficient surface tack to adhere firmly one to another and to maintain the desired relative position of the various parts prior to vulcanization. Absence of tack causes difficulty in the building operation. Thus, the tack of uncured rubber compounds has always been one of the most important properties required for building tires.

Tack of uncured rubber components, particularly treads, is an important property for building rubber articles, such as tires. The term "green tack" refers to the ability of two uncured rubber materials or surfaces to resist separation after bringing them into contact for a short time under relatively light pressure. It is important that uncured components, such as those in a tire, especially the tread, exhibit tack so that rubber components can be securely adhered the way that splices resist separation prior to vulcanization.

Lack of sufficient tack in uncured rubber components, especially treads, has been an ongoing problem. In the tire industry, tackifiers are often used to provide building tack to rubber compounds. Other than natural rubber, synthetic rubber does not have the sufficient building tack. Therefore, resin must be added to increase the tack. Building tack is an important prerequisite to enable tire building from flat layered materials. This building tack provides the handling strength of green tires until they are vulcanized. Another important feature is tack retention. Tire segments are pre-manufactured and then stored. During the storage time the building tack should not change.

Tackifiers, used in the manufacture of tires, should be compatible with synthetic rubbers and exhibit the desired tackifying effects in the synthetic rubbers. Tackifiers have a very low reactivity with the synthetic rubbers. This means that no substantial reaction occurs between the synthetic rubber and the tackifiers upon heating.

Tackifying resins can be divided into three groups, namely hydrocarbon resins, rosin resins and phenolic resins. Generally, there are two different types of tackifier resins used by the rubber industry, which are hydrocarbon resin tackifiers and phenolic resin tackifiers. Sometimes, blends of hydrocarbon resin and phenolic resin tackifiers are used.

Hydrocarbon tackifier resins provide good initial tack, but typically do not provide good long-term tack. Phenolic tackifiers provide good initial and long-term tack, but are expensive.

The hydrocarbon resins are less expensive than the phenolic resins, but require the use of up to three times the amount to give equivalent tack with tack retention being adversely affected. Since tackifiers which remain in the fabricated rubber article can tend to detract from the properties of the rubber, phenolic resins are often advantageously used because of the lower amount required.

The hydrocarbon resins include aliphatic, aromatic and alicyclic resins having a number average molecular weight of generally 500 to 5,000 Da and a softening point of at least 70° C. These resins, in general, are obtained, for example, by polymerizing isoprene, cyclopentadiene or dicyclopentadiene, or a styrene derivative or indene.

U.S. Pat. No. 4,071,676 describes a hydrogenated hydrocarbon resin having a molecular weight of from 500 to 1,500, which is composed (a) of a dicyclopentadiene and (b) of an aliphatic olefin with 8 carbon atoms. This hydrogenated hydrocarbon resin is described as having good adhesion properties and as not releasing formaldehyde.

WO 2019/045504 A1 describes a mixture of a compounding agent and a modified phenolic resin comprising a repeating unit derived from an aliphatic olefin monomer having 5 to 30 carbon atoms and a repeating unit derived from a phenolic monomer.

U.S. Pat. No. 4,039,724 describes reaction products of non-conjugated dienes with phenolic compounds in the presence of a Friedel-Crafts catalyst.

DE 24 50 590 A1 describes a tackifying adhesive mass comprising a rubbery material and a poly(phenol/diene) resin with alternating diene and phenol units with a glass transition temperature in the range of from 100° C. to 220° C., a number average molecular weight of from 600 to 5000 obtained by reacting 1 mol of non-conjugated diene with 1 to 1.75 moles of a phenolic compound with at least two ring carbon atoms that can be alkylated.

U.S. Pat. No. 4,764,571 describes epoxy resins based on phenol and dicyclopentadiene and a method of preparing the same. The epoxy resin is obtained from reacting epychlorohydrin with a resin obtained from the polymerization of a phenol and a dicyclopentadiene.

In the case of phenolic resins, para-tert-octylphenol (PTOP) and para-tert-butylphenol (PTBP) based novolaks are predominantly used by the tire industry. With phenolic novolak resins, tack retention of 2 days is achievable, and with a special resin made from para-tert-butylphenol and acetylene (Koresin®-BASF), tack retention of 8 days could be possible. However, the Koresin® price is very high and its availability is limited. Moreover, novolaks are known to release formaldehyde and consequently are substances of high concern with view to environmental aspects.

SUMMARY OF THE INVENTION

The object of the invention is regarded in the provision of a tackifier, which provides consistent level of green tack in elastomeric compositions over an extended period of time. Further, it shall not release aldehyde, especially formaldehyde and monomeric phenol and alkyl phenols in the molecule. Additionally, said tackifier shall be useful in tire production.

This object is solved with a low molar mass polymer tackifier having a number average molar mass (Mn) of from 200 to 1,500 g/mol comprising a phenol compound, a linker group L and end groups E, said low molar mass polymer tackifier having the structure as presented in formula 1 below:

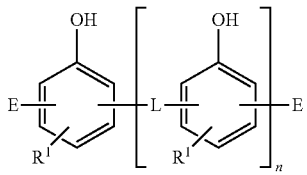

Formula 1 wherein the linker group L has the meaning of

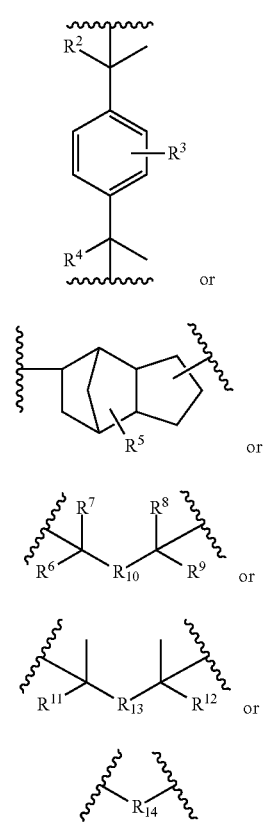

Formula 2 or

Formula 3 or

Formula 4 or

Formula 5 or

Formula 6 each end group E has the meaning of H or is a group of formula 2, 3, 4, 5 or 6 with only one bond to a phenol compound in formula 1 or has the meaning of

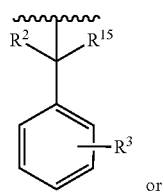

Formula 2c1 or

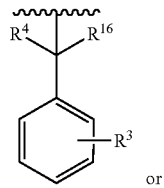

Formula 2c2 or

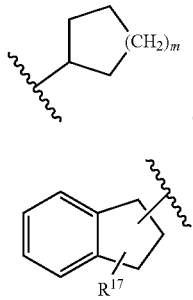

Formula 3c1 or

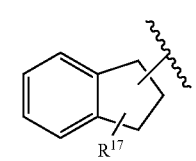

Formula 3c2 and wherein $R^1$ is H, $C_{1-15}$ alkyl, or $C_{1-15}$ oxyalkyl, $R^2$, $R^4$, $R^6$, $R^7$, $R^8$, $R^9$, $R^{11}$ and $R^{12}$ are independently from each other H or $C_{1-5}$ alkyl, $R^3$ and $R^5$ are H, OH, $NO_2$, halogen, $C_{1-5}$ alkyl or $C_{1-5}$ oxyalkyl, $R_{10}$ and $R_{13}$ are $C_{1-5}$ alkyl or $C_{5-6}$ cycloalkyl, $R_{14}$ is $C_{5-12}$ cycloalkyl, $R^{15}$, $R^{16}$, and $R^{17}$ are independently from each other H or $C_{1-5}$ alkyl, preferably —$CH_3$, m is an integer from 1 to 7 and n is an integer of from 2 to 21.

The invention is also directed to the use of the low molar mass polymer tackifier of the invention as a tackifier in mixtures with elastomeric compounds, in particular for the production of tires, technical rubber articles, rubber based sealants or rubber linings on substrates. Of course, also mixtures of tackifiers of the invention can be used for the aforementioned purposes.

The tackifier of the invention provides excellent green tack properties comparable to that of known tackifiers for elastomeric mixtures but also provides consistent green tack over an extended period of time as compared to known tackifiers. This long green tack stability is in particular advantageous for tire manufacture when the assembling of the tire is performed in different steps with each step being performed in a different company or factory. The term "green tack" means the tack of an unvulcanized rubber compound or elastomer compound.

DESCRIPTION OF THE INVENTION

The tackifier according to the invention may also be referred to as a terpolymer.

According to a preferred embodiment of the invention, $R^1$ is H, $C_{1-10}$ alkyl, in particular $C_{1-8}$ alkyl, more particularly $C_{1-5}$ alkyl, or $C_{1-10}$ oxyalkyl, in particular $C_{1-8}$ oxyalkyl, more particularly $C_{1-5}$ oxyalkyl.

Hence, according to a preferred embodiment, the object of the invention is solved with a low molar mass polymer tackifier having a number average molar mass (Mn) of from 200 to 1,500 g/mol comprising a phenol compound, a linker group L and end groups E, said low molar mass polymer tackifier having the structure as presented in formula 1 below:

Formula 1

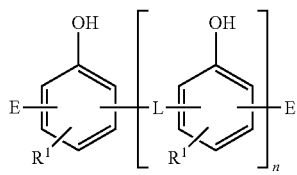

wherein the linker group L has the meaning of

Formula 2

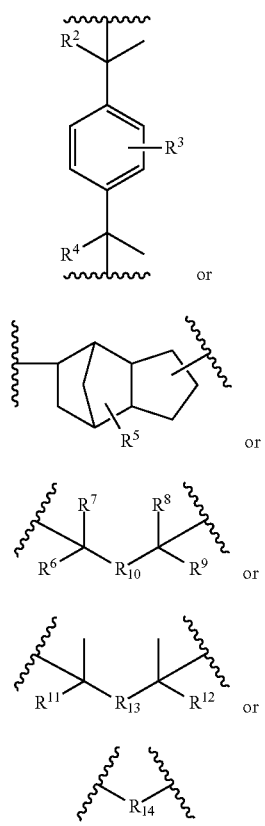

or

Formula 3 or

Formula 4 or

Formula 5 or

Formula 6 each end group E has the meaning of H or is a group of formula 2, 3, 4, 5 or 6 with only one bond to a phenol compound in formula 1, and wherein $R^1$ is H, $C_{1-5}$ alkyl, or $C_{1-5}$ oxyalkyl, $R^2$, $R^4$, $R^6$, $R^7$, $R^8$, $R^9$, $R^{11}$ and $R^{12}$ are independently from each other H or $C_{1-5}$ alkyl, $R^3$ and $R^5$ are H, OH, $NO_2$, halogen, $C_{1-5}$ alkyl or $C_{1-5}$ oxyalkyl, $R_{10}$ and $R_{13}$ are $C_{1-5}$ alkyl or $C_{5-6}$ cycloalkyl, $R_{14}$ is $C_{5-12}$ cycloalkyl, and n is an integer of from 2 to 21.

According to a preferred embodiment, the linker group L has the meaning of

Formula 2 wherein $R^2$, $R^3$, and $R^4$ are as defined herein for formula 2, in particular are H. It was found that polymeric tackifiers, in which the linker group L has the aforementioned meaning, in particular when $R^2$, $R^3$, and $R^4$ are H, have good properties. In particular, polymeric tackifiers with lower softening points can be achieved. With lower softening points, the processability and/or compatibility with other compounds such as rubber may be improved.

The low molar polymer tackifier of the invention can be prepared by polymerizing a phenol compound with one of the monomers of formulae 2a to 5a or a substituted or non-substituted $C_{5-12}$ cycloolefinic compound having at least two double bonds in a series of Friedel Crafts alkylation reactions. Alternatively to the monomers of formulae 2a to 5a, a monomer of formula 2b may be employed. The reaction is performed according to the known synthesis method of a Friedel Crafts alkylation reaction. The structure of the monomers according to formulae 2a to 5a or $C_{5-12}$ cycloolefinic group, which act as the linker L in the polymerization reaction, is selected as follows:

Formula 2a

Formula 3a

Formula 4a

Formula 5a or a $C_{5-12}$ cycloolefinic group with the residue $R^{14}$, wherein $R^2$ to $R^{13}$ have the meaning as explained before with view to the residues of formulae 2, 3, 4, and 5, and X is a hydroxyl group or a halogen selected of chlorine, bromine and iodine, and $R^{14}$ is substituted or non-substituted $C_{5-12}$ cycloalkenyl and the substitute can be methyl or ethyl.

The structure of formula 2b is as follows

Formula 2b

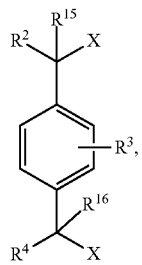

wherein $R^2$, $R^3$, and $R^4$ are as explained before with view to the residues of formula 2, $R^{15}$ and $R^{16}$ are independently from each other H or $C_{1-5}$ alkyl and X is a hydroxyl group or a halogen selected of chlorine, bromine and iodine. Preferably, the residues $R^2$, $R^4$, $R^{15}$ and $R^{16}$ have the meaning of H and/or alkyl having 1 to 2 carbon atoms. In a particular preferred embodiment, the residues $R^2$, $R^4$ have the meaning of H and the residues $R^{15}$ and $R^{16}$ have the meaning of —$CH_3$. Most preferably, the residues $R^{15}$ and $R^{16}$ have the meaning of —$CH_3$.

According to a preferred embodiment of the invention the residues $R^2$, $R^4$, $R^6$, $R^7$, $R^8$, $R^9$, $R^{11}$ and $R^{12}$ of the compound of formula 1 and accordingly in the monomers according to formulae 2a, 3a, 4a and 5a have the meaning of H and/or alkyl having 1 to 2 carbon atoms. In a particular preferred embodiment, the residues $R^2$, $R^4$, $R^6$, $R^7$, $R^8$, $R^9$, $R^{11}$ and $R^{12}$ have the meaning of H.

Formulae 2a, 3a, 4a, 5a or the cycloolefinic group with the residue $R^{14}$ as shown above represent the starting compounds for the polymerization of the low molar mass polymer tackifier of the invention whereas the groups of formulae 2, 3, 4 and 5 represent the corresponding resulting units L after polymerization in the low molar mass polymer tackifier of the invention. Formula 2b represents another possible starting compound for the polymerization yielding a corresponding linker unit L.

The starting compounds of formulae 2a, 3a, 4a, 5a and the cycloolefinic compound with the residue $R^{14}$ can be used as purified substances, but can also be used in a way, where the specific starting compound is part of a compound mixture. In particular, this can be the case if divinylbenzene is used as a starting compound in the polymerization of the tackifier of the invention. In case of employing such a compound mixture the starting compound should be present in the mixture at least in an amount of 50 wt. % to 100 wt. %, preferred 50 wt. % to 80 wt. %, based on the weight of the compounds of the mixture.

The phenol compound, which is subjected to polymerization with the compounds of formulae 2a to 5a and the cycloolefinic monomer comprising $R^{14}$ to produce a tackifier of formula 1 can be selected from phenol, $C_{1-15}$ alkyl phenol, in particular $C_{1-10}$ alkyl phenol, more particularly $C_{1-8}$ alkyl phenol, even more particularly $C_{1-5}$ alkyl phenol, and $C_{1-15}$ oxyalkyl phenol, in particular $C_{1-10}$ oxyalkyl phenol, more particularly $C_{1-8}$ oxyalkyl phenol, even more particularly $C_{1-5}$ oxyalkyl phenol, for example, o-cresol, m-cresol, p-cresol, ethyl phenol and isopropyl phenol.

The catalyst for the polymerization can be a Lewis acid or a Broensted acid. Preferably the catalyst is selected from $AlCl_3$, $BF_3$, $ZnCl_2$, $H_2SO_4$, $TiCl_4$ or mixtures thereof. The catalyst can be used in an amount of from 0.1 to 1 mol %. After the phenol compound is melted by heating at a temperature of 25° C. to 180° C., preferably 35° C. to 100° C., or dissolved in a suitable solvent (e.g. toluene), the catalyst is added. Thereafter, a monomer compound selected of formulae 2a to 5a or the cycloolefinic monomer comprising $R^{14}$ is added dropwise to the phenol compound. Alternatively, the catalyst is added to a mixture of the phenol compound and the monomer compound of formulae 2a to 5a or the cycloolefinic monomer comprising $R^{14}$. The reaction mixture may be cooled, for example from −10° C. to 10° C., when adding the catalyst. The time period of addition of a compound of formulae 2a, 3a, 4a, or 5a or the cycloolefinic monomer can be selected to be 10 minutes to 2 hours. The reaction can be continued for 1.5 to 2.5 hours. The polymerization reaction can be performed at a temperature of from 40° C. to 200° C., preferably 60° C. to 150° C. Preferably, the polymerization is performed at ambient pressure. The polymerization can be quenched by the addition of suitable additives, preferably lime. The obtained polymers can be purified by filtration and/or steam distillation.

The molar mass (Mn) of the low molar mass polymer tackifier of the invention is in the range of from 200 to 1,500 g/mol, preferably in the range of from 350 or 400 to 800 g/mol.

The tackifier of the invention preferably has a mass average molecular mass (Mw) of 500 to 12,000 g/mol, more preferably from 600 to 10,000 g/mol, even more preferably from 700 to 9000 g/mol.

The tackifier of the invention preferably has a z-average molecular mass (Mz) of 800 to 35,000 g/mol, more preferably from 900 to 25,000 g/mol, even more preferably from 1,000 to 20,000 g/mol.

The number average molecular mass (Mn), the mass average molecular mass (Mw), and the z-average molecular mass (Mz) may in particular be determined using gel permeation chromatography (GPC). In GPC, styrene-divinylbenzene copolymers may be used as column material. A 3 μm precolumn and three 3 μm 1000 Å main columns may be used. A SECcurity²-System by PSS-Polymers may be used. The substances may be detected with an RI detector. Unstabilized ULC/MS-grade THF is preferably used as eluent. The measurements are preferably run isothermal at 40° C. For the calibration curve, ReadyCal-Kit Poly(styrene) low (Mp 266-66,000 Da) by PSS-Polymer may be used as external standard.

It was found that tackifiers with lower molecular weights in the aforementioned ranges exhibited improved properties, in particular improved compatibility and miscibility with the rubber component.

The tackifier of the invention advantageously has a glass transition temperature (Tg) of from 0° C. to 90° C., preferably from 10° C. to 80° C., more preferably from 20° C. to 70° C., and most preferably from 30° C. to 60° C. It was found that tackifiers with a glass transition temperature in the aforementioned ranges show good processability and/or good compatibility with other compounds such as rubber.

The glass transition temperature is preferably measured using differential scanning calorimetry (DSC). A DSC 2/400 with intra cooler from Mettler Toledo may be employed. For the measurement, aluminum crucibles with pin holes, in particular ME-26763 AL-Crucibles, may be employed. For the evaluation of the glass transition temperature, a heating-cooling-heating-cooling sequence may be employed with a heating/cooling rate of 10 K/min within a measuring window between −40° C. to 150° C. The Tg evaluation is preferably performed in accordance to DIN 53765, in particular DIN 53765:1994-03.

The tackifier of the invention may comprise 50 wt. % to 70 wt. % of the phenol compound, 20 wt. % to 50 wt. % of the linker group L, in particular of difunctional monomers (linker L) selected from a divinylbenzene compound, a diclyclopentadiene compound or a compound of formula 4, 5 or 6 and 0 wt. % to 30 wt. % or 0 wt. % to 50 wt. %, in particular 5 wt. % to 40 wt. %, more particularly 10 wt. % to 35 wt. %, of the end group E, in particular monofunctional monomers (end group E] based on the weight (mass) of the polymeric tackifier. The divinylbenzene compound is preferably a compound of formula 2, more preferably a compound of formula 2 wherein $R^2$, $R^3$, and $R^4$ are as defined herein, most preferably wherein $R^2$, $R^3$, and $R^4$ are H. The dicyclopentadiene compound is preferably a compound of formula 3. The term monofunctional monomer used before refers to a compound, which can be present in the starting mixture of compounds of formulae 2a, 4a, 5a and the cycloolefinic group including residue $R_{14}$ for the polymerization of the tackifier of the invention, which however has only one double bond or one halogen capable to react in the polymerization reaction to obtain the tackifier of the invention. Such modified starting compound or monofunctional starting compound acts as a chain stopper in the polymerization reaction. It can form the end group E of formula 1.

According to a preferred embodiment, the end group E may have the meaning of

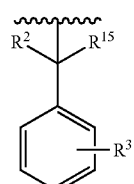

Formula 2c1 or

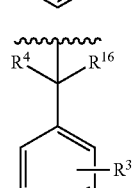

Formula 2c2 or

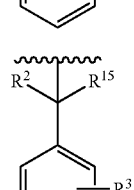

Formula 2c3 or

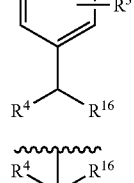

Formula 2c4 or

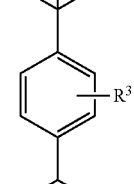

Formula 2c5 or

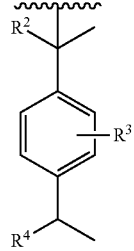

Formula 2c6 or

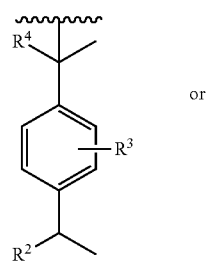

Formula 4c1 or

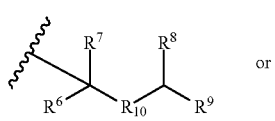

Formula 4c2 or

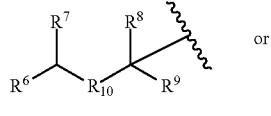

Formula 5c1 or

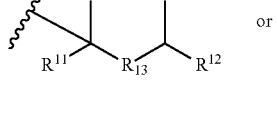

Formula 5c2 or

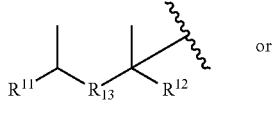

Formula 3c1 or

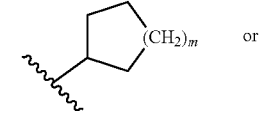

Formula 3c2

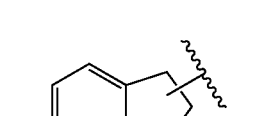

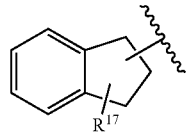

wherein $R^2$ to $R^{13}$ have the meaning as explained before with view to the residues of formulae 2, 3, 4, and 5, m is an integer from 1 to 7 and $R^{15}$, $R^{16}$, and $R^{17}$ are independently from each other H or $C_{1-5}$ alkyl, preferably —$CH_3$.

When using end groups E that are different from H, in particular with end groups E with the meaning of the aforementioned formulas, the tackifying properties of the tackifier can be adjusted. It was found that when larger amounts of the end group E were incorporated into the tackifier, the tack could be increased. Moreover, the compatibility of the tackifier with other compounds could be improved.

The end group E may also have the meaning of a $C_{5-12}$ cycloalkyl group optionally substituted with the residue $R^{14}$, wherein $R^{14}$ is substituted or non-substituted $C_{5-12}$ cycloalkenyl and the substitute can be methyl or ethyl.

Accordingly, the end group E may advantageously be obtained from monofunctional monomers having the meaning of

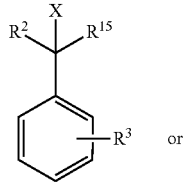

Formula 2d1

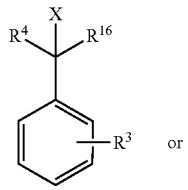

Formula 2d2

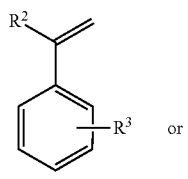

Formula 2d3

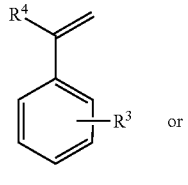

Formula 2d4

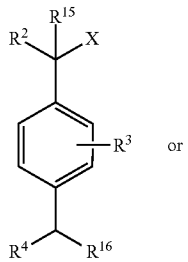

Formula 2d5

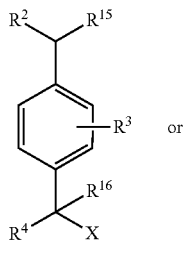

Formula 2d6

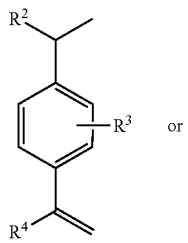

Formula 2d7

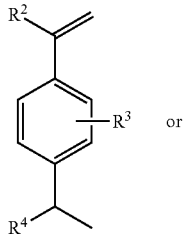

Formula 2d8

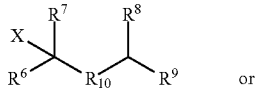

Formula 4d1

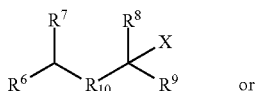

Formula 4d2

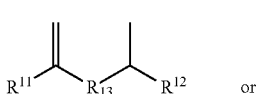

Formula 5d1

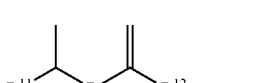

Formula 5d2

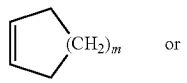

Formula 3d1

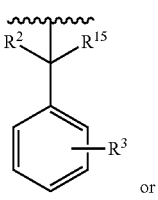

Formula 3d2 wherein $R^2$ to $R^{13}$ have the meaning as explained before with view to the residues of formulae 2, 3, 4, and 5, $R^{15}$, $R^{16}$, and $R^{17}$ are independently from each other H or $C_{1-5}$ alkyl, preferably —$CH_3$, m is an integer from 1 to 7 and X is a hydroxyl group or a halogen selected of chlorine, bromine and iodine.

The end group E may also be obtained from a monomer having the meaning of a $C_{5-12}$ cycloolefinic group, in particular with one double bond, optionally substituted with the residue $R^{14}$, wherein $R^{14}$ is substituted or non-substituted $C_{5-12}$ cycloalkenyl and the substitute can be methyl or ethyl.

According to an embodiment, the end group E has the meaning of

Formula 2c1

Formula 2c2

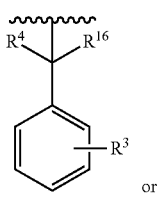

or

Formula 2c3

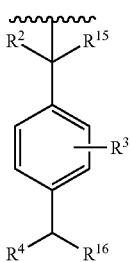

or

Formula 2c4

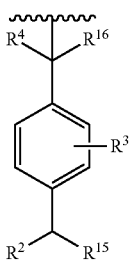

or

Formula 2c5

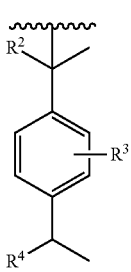

or

Formula 2c6

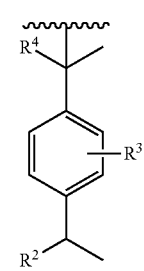

wherein $R^2$, $R^3$, $R^4$, $R^{15}$, and $R^{16}$ are independently from each other H or $C_{1-5}$ alkyl, preferably wherein independently from each other $R^3$ is H, $R^2$ is H or $CH_3$, $R^4$ is H or —$CH_3$, $R^{15}$ is $C_{1-5}$ alkyl, and $R^{16}$ is $C_{1-5}$ alkyl, preferably —$CH_3$.

According to a preferred embodiment, the end group E is a group of formula 2 with only one bond to a phenol compound in formula 1, in particular the end group E has the meaning of Formula 2c5

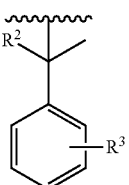

or

Formula 2c6

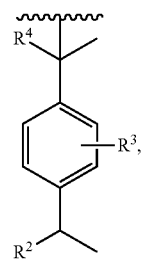

wherein $R^2$, $R^3$, and $R^4$ are independently from each other H or $C_{1-5}$ alkyl, preferably H.

According to a preferred embodiment, the linker group L has the meaning of

Formula 2

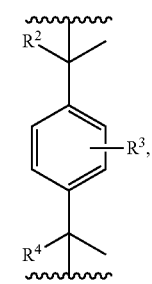

and the end group E has the meaning of

Formula 2c5

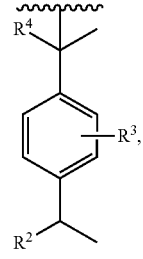

or

Formula 2c6

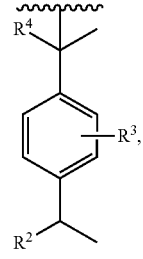

wherein $R^2$, $R^3$, and $R^4$ are independently from each other H or $C_{1-5}$ alkyl, preferably H.

The tackifier of the invention may have a high OH content, preferably of 5 to 13 wt. %, in particular preferred 6 to 9 wt. % based on the weight of the tackifier. The tackifier preferably has a softening point according to ASTM 3461 up to 170° C., more preferred 40° C. to 120° C., most preferred 50° C. to 100° C.

The tackifier of the invention may advantageously be used in rubber compositions or synthetic rubber (elastomer) compositions at a dosage of 1 phr to 25 phr, preferred 2 to 10 phr, more preferred 4 to 7 phr (parts per hundred rubber).

The tackifier of the invention does not release formaldehyde. The tackifier of the invention can be delivered in liquid form as molten fluid, as solid material in pastilles or flakes or as dry liquid with a solid material as a carrier.

The tackifier of the invention can be used in the production of tires. The tires can be passenger car tires, bus and truck tires, off the road tires and inflating tires. The tackifier can be used for tire retreading to improve the adhesion of tread of carcass.

The tackifier of the invention can be used in the production of technical rubber goods, such as conveyor belts, hoses, ring, sealing material, dumping material and gaskets.

The tackifier of the invention improves the adhesion between green rubber plies, tread, side wall, textile cord, steel cord and bead belts.

In tires and technical rubber, the tackifier of the invention provides good inter layer adhesion of unvulcanized rubber. The increased adhesion improves handling in tire building and in the construction of rubber parts.

The following examples serve to further explain the invention.

EXAMPLES

Abbreviations

SP=Softening point
DVB=Divinylbenzene
EVB=Ethylvinylbenzene
DIPB=Diisopropenylbenzene
DVBP=Divinylbenezene-phenol
DCPD=Dicyclopentadiene
Suppliers of chemicals:

| Chemical | Purity | Supplier |
|---|---|---|
| DVB | 62% | Sigma-Aldrich |
| DVB | 80% | Sigma-Aldrich |
| DCPD | 80% | Braskem |
| DIPB | >98% | Sigma-Aldrich |
| Phenol | 99% | PanReac AppliChem |
| 4-Tert-octylphenol | 97% | Sigma-Aldrich |
| $BF_3*OEt_2$ | >98% | Bernd Kraft |
| Xylene | >98% | Bernd Kraft |

Example 1

Phenol (282 g) was dissolved in toluene (138 g) in a three-neck flask equipped with a dimroth coil condenser and a dropping funnel at 70° C. followed by the addition of $BF_{3*}(OEt_2)$ (2.01 mL). Divinyl benzene (195 g, 62% purity) was added dropwise via the dropping funnel over a period of 30 minutes to the reaction mixture. After the addition the solution was stirred for 2 hours at a reaction temperature of 90° C. The polymerization was quenched by addition of chalk. Filtration of the crude product and purification via steam distillation at 230° C. yielded the resin as colorless solid. The results of the characterization of the tackifier are presented in the table below.

TABLE 1

Analysis values example 1

| SP [° C.] ASTM 3461 | Tg [° C.] | OH content [wt. %] | Mn [g/mol] | Mw [g/mol] | Mz [g/mol] |
|---|---|---|---|---|---|
| 42 | 13 | 8.6 | 528 | 735 | 1066 |

Example 2

Phenol (254 g) was dissolved in toluene (138 g) in a three-neck flask equipped with a dimroth coil condenser and a dropping funnel at 70° C. followed by the addition of $BF_{3*}(OEt_2)$ (2.01 mL). Divinyl benzene (195 g, 62% purity) was added dropwise via the dropping funnel over a period of 30 minutes to the reaction mixture. After the addition the solution was stirred for 2 hours at a reaction temperature of 90° C. The polymerization was quenched by addition of chalk. Filtration of the crude product and purification via steam distillation at 230° C. yielded the resin as colorless solid. The results of the characterization of the tackifier are presented in the table below.

TABLE 2

Analysis values example 2

| SP [° C.] ASTM 3461 | Tg [° C.] | OH content [wt. %] | Mn [g/mol] | Mw [g/mol] | Mz [g/mol] |
|---|---|---|---|---|---|
| 53 | 27 | 7.3 | 592 | 960 | 1683 |

TABLE 3

Summary of example 1-2

| | Molar ratio Phenol:DVB:EVB | | | SP [° C.] ASTM 3461 | Tg [° C.] | OH Content [wt. %] | Mn [g/mol] | Mw [g/mol] | Mz [g/mol] |
|---|---|---|---|---|---|---|---|---|---|
| Example 1 | 3.6 | 1.7 | 1.0 | 42 | 13 | 8.6 | 528 | 735 | 1066 |
| Example 2 | 3.2 | 1.7 | 1.0 | 53 | 27 | 7.3 | 592 | 960 | 1683 |

Example 3

Phenol (94 g) was dissolved in toluene (61 g) in a three-neck flask equipped with a dimroth coil condenser and a dropping funnel at 40° C. followed by the addition of $BF_{3*}(OEt_2)$ (0.88 mL). Dicyclopentadiene (44 g, 80% purity, 5% vinyl aromatics (indene, methyl styrene isomers) provided by Braskem) was added dropwise via the dropping funnel over a period of 30 minutes to the reaction mixture. After the addition the solution was stirred for 3 hours at a reaction temperature of 120° C. The polymerization was quenched by addition of chalk. Filtration of the crude product and purification via steam distillation at 250° C. yielded the resin as red solid. The results of the characterization of the tackifier are presented in the table below.

TABLE 4

| Analysis values example 3 | | | | | |
| --- | --- | --- | --- | --- | --- |
| SP [° C.] ASTM 3461 | Tg [° C.] | OH content [wt. %] | Mn [g/mol] | Mw [g/mol] | Mz [g/mol] |
| 98 | 65 | 7.8 | 487 | 702 | 1049 |

Example 4

Phenol (282 g) was dissolved in toluene (92 g) in a three-neck flask equipped with a dimroth coil condenser and a dropping funnel at 40° C. followed by the addition of $BF_{3*}(OEt_2)$ (2.70 mL). Dicyclopentadiene (132 g, 80% purity, 5% vinyl aromatics (indene, methyl styrene isomers) provided by Braskem) was added dropwise via the dropping funnel over a period of 30 minutes to the reaction mixture. After the addition the solution was stirred for 3 hours at a reaction temperature of 120° C. The polymerization was quenched by addition of chalk. Filtration of the crude product and purification via steam distillation at 250° C. yielded the resin as red solid. The results of the characterization of the tackifier are presented in the table below.

TABLE 5

| Analysis values example 4 | | | | | |
| --- | --- | --- | --- | --- | --- |
| SP [° C.] ASTM 3461 | Tg [° C.] | OH content [wt. %] | Mn [g/mol] | Mw [g/mol] | Mz [g/mol] |
| 109 | 72 | 7.0 | 510 | 761 | 1168 |

Example 5

4-Tert-octylphenol (255 g) was dissolved in xylene (255 g) in a three-neck flask equipped with a dimroth coil condenser and a dropping funnel at 70° C. followed by the addition of $BF_{3*}(OEt_2)$ (0.921 mL). Divinylbenzene (195 g, 62% purity: divinylbenzene:ethylvinylbenzene=62:38) was added dropwise via the dropping funnel over a period of 14 minutes to the reaction mixture. After the addition the solution was stirred for 2 hours at a reaction temperature of 90° C. The polymerization was quenched by the addition of chalk. Filtration of the crude product and purification via steam distillation at 230° C. yielded the resin as colorless solid. The results of characterization of the tackifier are presented in the table below.

TABLE 6

| Analysis values example 5 | | | | | |
| --- | --- | --- | --- | --- | --- |
| SP [° C.] ASTM 3461 | Tg [° C.] | OH content [wt. %] | Mn [g/mol] | Mw [g/mol] | Mz [g/mol] |
| 41 | 4.4 | 5.5 | 588 | 897 | 1321 |

Example 6

Phenol (254 g) and divinylbenzene (195 g, 62% purity: divinylbenzene:ethylvinylbenzene=62:38) was dissolved in Xylene (138 g) in a three-neck flask equipped with a dimroth coil condenser and a dropping funnel at 30° C. followed by the portion wise addition of $BF_{-3*}(OEt_2)$ (0.624 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 7

| Analysis values example 6 | | | | | |
| --- | --- | --- | --- | --- | --- |
| SP [° C.] ASTM 3461 | Tg [° C.] | OH content [wt. %] | Mn [g/mol] | Mw [g/mol] | Mz [g/mol] |
| 68 | 31 | 7.7 | 711 | 1379 | 2564 |

Example 7

Phenol (203 g) and divinylbenzene (195 g, 62% purity: divinylbenzene:ethylvinylbenzene=62:38) was dissolved in xylene (138 g) in a three-neck flask equipped with a dimroth coil condenser and a dropping funnel at 30° C. followed by the portion wise addition of $BF_{-3*}(OEt_2)$ (0.624 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 8

| Analysis values example 7 | | | | | |
| --- | --- | --- | --- | --- | --- |
| SP [° C.] ASTM 3461 | Tg [° C.] | OH content [wt. %] | Mn [g/mol] | Mw [g/mol] | Mz [g/mol] |
| 77 | 37 | 6.8 | 850 | 2014 | 4234 |

Example 8

Phenol (177 g) and divinylbenzene (195 g, 62% purity: divinylbenzene:ethylvinylbenzene=62:38) was dissolved in xylene (138 g) in a three-neck flask equipped with a dimroth coil condenser and a dropping funnel at 30° C. followed by the portion wise addition of BF-$_{3*}$(OEt$_2$) (0.624 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 9

Analysis values example 8

| SP [° C.] ASTM 3461 | Tg [° C.] | OH content [wt. %] | Mn [g/mol] | Mw [g/mol] | Mz [g/mol] |
|---|---|---|---|---|---|
| 84 | 40 | 6.0 | 953 | 2902 | 7177 |

Example 9

Phenol (141 g) and divinylbenzene (195 g, 62% purity: divinylbenzene:ethylvinylbenzene=62:38) was dissolved in xylene (138 g) in a three-neck flask equipped with a dimroth coil condenser and a dropping funnel at 30° C. followed by the portion wise addition of BF-$_{3*}$(OEt$_2$) (0.624 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 10

Analysis values example 9

| SP [° C.] ASTM 3461 | Tg [° C.] | OH content [wt. %] | Mn [g/mol] | Mw [g/mol] | Mz [g/mol] |
|---|---|---|---|---|---|
| 98 | 49 | 5.8 | 1228 | 6787 | 21520 |

Example 10

Phenol (141 g) and divinylbenzene (215 g, 62% purity: divinylbenzene:ethylvinylbenzene=62:38) was dissolved in xylene (138 g) in a three-neck flask equipped with a dimroth coil condenser and a dropping funnel at 30° C. followed by the portion wise addition of BF-$_{3*}$(OEt$_2$) (0.624 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 11

Analysis values example 10

| SP [° C.] ASTM 3461 | Tg [° C.] | OH content [wt. %] | Mn [g/mol] | Mw [g/mol] | Mz [g/mol] |
|---|---|---|---|---|---|
| 104 | 46 | 5.5 | 1405 | 9468 | 30130 |

TABLE 12

Summary of example 6-10

| | Ratio phenol:DVB:EVB | | | SP [° C.] ASTM 3461 | Tg [° C.] | OH Content [wt. %] | Mn [g/mol] | Mw [g/mol] | Mz [g/mol] |
|---|---|---|---|---|---|---|---|---|---|
| Example 6 | 3.2 | 1.7 | 1.0 | 68 | 31 | 7.7 | 711 | 1379 | 2564 |
| Example 7 | 2.6 | 1.7 | 1.0 | 77 | 37 | 6.8 | 850 | 2014 | 4234 |
| Example 8 | 2.3 | 1.7 | 1.0 | 84 | 40 | 6.0 | 953 | 2902 | 7177 |
| Example 9 | 1.8 | 1.7 | 1.0 | 98 | 49 | 5.8 | 1228 | 6787 | 21520 |
| Example 10 | 1.5 | 1.7 | 1.0 | 104 | 46 | 5.5 | 1405 | 9468 | 30130 |

Example 11

Phenol (254 g) and divinylbenzene (195 g, 80% purity: divinylbenzene:ethylvinylbenzene=80:20) was dissolved in xylene (138 g) in a three-neck flask equipped with a dimroth coil condenser and a dropping funnel at 30° C. followed by the portion wise addition of BF-3*(OEt$_2$) (0.234 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 13

Analysis values example 11

| SP [° C.] ASTM 3461 | Tg [° C.] | OH content [wt. %] | Mn [g/mol] | Mw [g/mol] | Mz [g/mol] |
|---|---|---|---|---|---|
| 93 | 53 | 7.2 | 963 | 2209 | 4628 |

Example 12

Phenol (207 g) and divinylbenzene (195 g, 80% purity: divinylbenzene:ethylvinylbenzene=80:20) was dissolved in xylene (138 g) in a three-neck flask equipped with a dimroth coil condenser and a dropping funnel at 30° C. followed by the portion wise addition of BF-3*(OEt$_2$) (0.234 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 14

Analysis values example 12

| SP [° C.] ASTM 3461 | Tg [° C.] | OH content [wt. %] | Mn [g/mol] | Mw [g/mol] | Mz [g/mol] |
|---|---|---|---|---|---|
| 101 | 57 | 6.6 | 1149 | 3976 | 10400 |

TABLE 15

Comparison of example 6-7 and 11-12

| | Molar ratio phenol:DVB:EVB | | | Molar ratio phenol:sum (DVB + EVB) | | SP [° C.] ASTM 3461 | Tg [° C.] | OH Content [wt. %] | Mn [g/mol] | Mw [g/mol] | Mz [g/mol] |
|---|---|---|---|---|---|---|---|---|---|---|---|
| Example 6  | 3.2 | 1.7 | 1.0 | 1.8 | 1.0 | 68  | 31 | 7.7 | 711  | 1379 | 2564  |
| Example 11 | 6.1 | 4.1 | 1.0 | 1.8 | 1.0 | 93  | 53 | 7.2 | 963  | 2209 | 4628  |
| Example 7  | 2.6 | 1.7 | 1.0 | 1.5 | 1.0 | 77  | 37 | 6.8 | 850  | 2014 | 4234  |
| Example 12 | 5.0 | 4.1 | 1.0 | 1.5 | 1.0 | 101 | 57 | 6.6 | 1149 | 3976 | 10400 |

Example 13

Phenol (141 g) and diisopropylbenzene (158 g) was dissolved in xylene (138 g) in a three-neck flask equipped with a dimroth coil condenser and a dropping funnel at 30° C. followed by the portion wise addition of BF$_{3*}$(OEt$_2$) (0.234 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 16

Analysis values example 13

| SP [° C.] ASTM 3461 | Tg [° C.] | OH content [wt. %] | Mn [g/mol] | Mw [g/mol] | Mz [g/mol] |
|---|---|---|---|---|---|
| 140 | 82 | 3.6 | 1654 | 7567 | 21890 |

Example 14

Phenol (141 g), styrene (52 g) and diisopropenylbenzene (79 g) was dissolved in xylene (138 g) in a three-neck flask equipped with a dimroth coil condenser and a dropping funnel at 30° C. followed by the portion wise addition of BF$_{3*}$(OEt$_2$) (0.234 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 17

Analysis values example 14

| SP [° C.] ASTM 3461 | Tg [° C.] | OH content [wt. %] | Mn [g/mol] | Mw [g/mol] | Mz [g/mol] |
|---|---|---|---|---|---|
| 96 | 46 | 4.2 | 722 | 2110 | 4853 |

Example 15

Phenol (141 g), styrene (73 g) and diisopropenylbenzene (48 g) was dissolved in Xylene (138 g) in a three-neck flask equipped with a dimroth coil condenser and a dropping funnel at 30° C. followed by the portion wise addition of BF$_{3*}$(OEt$_2$) (0.234 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 18

Analysis values example 15

| SP [° C.] ASTM 3461 | Tg [° C.] | OH content [wt. %] | Mn [g/mol] | Mw [g/mol] | Mz [g/mol] |
|---|---|---|---|---|---|
| 58 | 9 | 4.9 | 435 | 1138 | 2608 |

TABLE 19

Summary of example 13-15

| | Ratio diisopropenyl benzene:styrene* | SP [° C.] ASTM 3461 | Tg [° C.] | OH Content [wt. %] | Mn [g/mol] | Mw [g/mol] | Mz [g/mol] |
|---|---|---|---|---|---|---|---|
| Example 13 | 1.0 | 0 | 140 | 82 | 3.6 | 1654 | 7567 | 21890 |
| Example 14 | 1.0 | 1.0 | 96 | 46 | 4.2 | 722 | 2110 | 4853 |
| Example 15 | 0.4 | 1.0 | 58 | 9 | 4.9 | 435 | 1138 | 2608 |

*ratio of phenol to the sum of diisopropenyl benzene and styrene is kept constant Example 16

Phenol (141 g), α-methylstyrene (59 g) and diisopropenylbenzene (79 g) was dissolved in xylene (138 g) in a three-neck flask equipped with a dimroth coil condenser and a dropping funnel at 30° C. followed by the portion wise addition of $BF_{3*}(OEt_2)$ (0.234 mL). The reaction mixture was cooled by an ice bath. After the addition the solution was stirred for 1 hour at a reaction temperature of 70° C. The polymerization was quenched by the addition of chalk. Filtration of the crude product and purification via steam distillation at 230° C. yielded the resin as colorless solid. The results of characterization of the tackifier are presented in the table below.

TABLE 20

Analysis values example 16

| SP [° C.] ASTM 3461 | Tg [° C.] | OH content [wt. %] | Mn [g/mol] | Mw [g/mol] | Mz [g/mol] |
|---|---|---|---|---|---|
| 81 | 40 | 3.4 | 590 | 1444 | 3244 |

As can be seen from the exemplary syntheses above, the properties of the polymeric tackifier can be varied in a wide range.

Explanation of the Analytical Methods

Molar Mass Distribution via GPC

The molar mass distribution (Mn, Mw, Mz) was estimated via gel permeation chromatography (GPC) with a SECcurity$^2$-System supplied by the company PSS-Polymers.

The used column system consists of a 3 μm precolumn and three 3 μm 1000 Å main columns filled with a styrene divinylbenzene copolymer as column material. For substance detection a refraction index (RI) detector was used. Unstabilized ULC/MS-grade THF was used as eluent supplied by the company Biosolve. Each measurement run was performed isothermal at 40° C. ReadyCal-Kit Poly(styrene) low (Mp 266-66 000 Da) was used as external standard supplied by PSS-Polymer.

Glass Transition Temperature Via DSC

The glass transition temperature (Tg) was estimated with a DSC 2/400 with intra cooler supplied by the company Mettler Toledo. Aluminum crucibles with pin hole with a volume of 40 μl (Me-26763 AL-Crucibles) were used as sample vessels. The sample weight amounted to 10-20 mg. For the evaluation of the thermal properties, a heating-cooling-heating-cooling sequence was chosen as analytical method with a heating/cooling rate of 10 K/min within a measuring window between −40° C. to 150° C. The Tg evaluation was performed in accordance to DIN 53765.

Softening Point (SP) Via Mettler Ring & Ball

The softening points were estimated via the method "Ring & Ball" in accordance to ASTM D 3461 "Softening point of asphalt and pitch—Mettler cup and ball method". A FP 90 Central Processor in combination with a FP 83 HT Dropping Point Cell supplied by Mettler Toledo was used a testing device.

Hydroxyl Content

The hydroxyl content was estimated via a potentiometric titration in accordance to DIN 53240-2 (1-methylimidazol catalyzed acetylation of free OH-groups with acetic anhydride followed by a titration with 0.5 M NaOH). The measurement was performed with an automated titration unite (Titrando in combination with Titroprozessor 840 Touch Control and Dosimate 6.2061.010) supplied by Deutsche Metrohm GmbH & Co. KG.

Application of Tackifier in Elastomer Compounds

For comparison purposes an acetylene alkylphenol copolymer, Koresin® and an (alkyl-)phenol-formaldehyde condensate known as Deotack® RS are used in the following compositions.

Mixtures M01 to M05 are prepared in 3 steps. In step 1, the mixing unit, a Werner & Pfleiderer GK 1.5 E, is filled to 70% of the volume of the mixing unit. The start temperature is controlled at 70° C. and the rotation speed is adjusted to 50 min$^{-1}$. Polymers are first added during a time period of 1 minute. The silicic acid, Si 69, ZnO, stearic acid, IPPD, 6PPD, TMQ and tackifiers are added from minute 1 to 6. The stamp is vented after 5 minutes. The temperature of the mixture after ejection is 140° C.

In step 2, the mixing unit is filled to 70% of the volume of the mixing unit. The start temperature is controlled at 80° C. and the rotation speed is adjusted to 60 min$^{-1}$. The mixture from step 1 is added during a time period of 1 minute. The stamp is vented after 3 and 5 minutes. The temperature of the mixture after ejection is 155° C.

In step 3, the mixing unit is filled to 70% of the volume of the mixing unit. The start temperature is controlled at 35° C. and the rotation speed is adjusted to 30 min$^{-1}$. The mixture from step 2 is added during a time period of 1 minute. The sulfur, CBS and DPG are added from minute 1 to 4.

TABLE 21

Recipe 1 SBR/BR PCR tread formulation

| Recipe | M01 | M02 | M03 | M04 | M05 |
|---|---|---|---|---|---|
| Buna ® VSL 4516-1 | 96.0 | 96.0 | 96.0 | 96.0 | 96.0 |
| Buna ® CB24 | 30.0 | 30.0 | 30.0 | 30.0 | 30.0 |
| Ultrasil ® 7000GR | 80.0 | 80.0 | 80.0 | 80.0 | 80.0 |
| Carbon black N234 | 10.0 | 10.0 | 10.0 | 10.0 | 10.0 |
| Luvomaxx ® TESPT | 8.0 | 8.0 | 8.0 | 8.0 | 8.0 |
| ZnO RS | 3.0 | 3.0 | 3.0 | 3.0 | 3.0 |
| Stearic acid | 1.0 | 1.0 | 1.0 | 1.0 | 1.0 |
| Vulkanox ® 4010/IPPD | 1.0 | 1.0 | 1.0 | 1.0 | 1.0 |
| Vulkanox ® 4020/6PPD | 2.0 | 2.0 | 2.0 | 2.0 | 2.0 |
| Vulkanox ® HS/TMQ | 0.5 | 0.5 | 0.5 | 0.5 | 0.5 |
| Koresin ® | — | 5.0 | — | — | — |
| Deotack ® RS | — | — | 5.0 | — | — |
| Novares ® Lab (example 1) | — | — | — | 5.0 | — |
| Novares ® Lab (example 3) | — | — | — | — | 5.0 |
| Sulfur | 1.5 | 1.5 | 1.5 | 1.5 | 1.5 |
| Vulkacit ® CZ/CBS | 1.5 | 1.5 | 1.5 | 1.5 | 1.5 |
| Luvomaxx ® DPG | 2.0 | 2.0 | 2.0 | 2.0 | 2.0 |

The amounts given in the table for the components are expressed in parts per hundred rubber (phr).

The green tack of compositions M01 to M05 was tested. The results are presented in the table below.

TABLE 22

Green tack [N] of above SBR/BR tread compound after 5 and 11 days

| | M01 | M02 | M03 | M04 | M05 |
|---|---|---|---|---|---|
| 5 days | | | | | |
| | 63.2 | 73.0 | 42.0 | 88.6 | 67.2 |
| | 66.0 | 75.4 | 44.2 | 88.6 | 69.6 |
| | 68.4 | 78.4 | 46.6 | 89.0 | 71.6 |
| | 71.0 | 82.0 | 48.4 | 90.2 | 72.4 |
| | 72.4 | 84.4 | 48.2 | 89.9 | 73.6 |
| Average | 68.2 | 78.6 | 45.9 | 89.3 | 70.9 |
| Standard deviation | 3.3 | 4.2 | 2.5 | 0.7 | 2.3 |
| 11 days | | | | | |
| | 40.4 | 85.8 | 73.2 | 82.6 | 55.8 |
| | 41.0 | 87.8 | 75.0 | 83.4 | 56.4 |
| | 40.6 | 88.6 | 75.0 | 92.0 | 56.6 |
| | 41.4 | 89.6 | 75.8 | 91.8 | 56.8 |
| | 41.2 | 86.2 | 74.2 | 89.0 | 57.6 |
| Average | 40.9 | 87.6 | 74.6 | 87.8 | 56.6 |
| Standard deviation | 0.4 | 1.4 | 0.9 | 4.0 | 0.6 |

The unity of the measured green tack is Newton. The measurement of the green tack is according to the method of the internal method of Deutsches Institut für Kautschuktechnologie e.V. (DIK) (German Institut for Rubber Technology). A rubber sheet (unvulcanized compound) is placed on the lower part of a sample holder of the testing device. The rubber sheet is covered and fixed by the mask to obtain a defined contact area of 700 mm$^2$ (round opening). This procedure is done for the top and bottom sample holder. Both clamps that fix the rubber sheets are built into the testing device as it can be seen in the following image. The compound surfaces are pressured against each other with a force of 50 N for 45 seconds. The separating force is measured when the surfaces are separated by 120 mm/min. The maximal force needed to separate the compounds is recorded.

Mixtures M06 to M10 are prepared as follows. The mixing unit, a Werner & Pfleiderer GK 1.5 E, is filled to 70% of the volume of the mixing unit. The start temperature is controlled to be 40° C. and the rotation speed is adjusted to 50 min$^{-1}$. Polymers are first added during a time period of 1 minute. The carbon black, ZnO, stearic acid, ASM and oil are added from minute 1 to 3. After 3 minutes, the rotation speed is adjusted to 30 min$^{-1}$. The sulfur and promoters are added from minute 4 to 6. The mixture is ejected, homogenized on a rolling mill and overturned 6 times.

TABLE 23

Test recipe: NR OTR tread formulation

| Recipe | M06 | M07 | M08 | M09 | M10 |
|---|---|---|---|---|---|
| NRRSS1 | 100.0 | 100.0 | 100.0 | 100.0 | 100.0 |
| Carbon black N115 | 50.0 | 50.0 | 50.0 | 50.0 | 50.0 |
| ZnO | 4.0 | 4.0 | 4.0 | 4.0 | 4.0 |
| Stearic acid | 2.0 | 2.0 | 2.0 | 2.0 | 2.0 |
| Vulkanox ® 4020/6PPD | 1.0 | 1.0 | 1.0 | 1.0 | 1.0 |
| Vulkanox ® HS/TMQ | 1.0 | 1.0 | 1.0 | 1.0 | 1.0 |
| Antilux ® 500 | 1.5 | 1.5 | 1.5 | 1.5 | 1.5 |
| Viva tec ® 500 | 4.0 | 4.0 | 4.0 | 4.0 | 4.0 |
| Koresin ® | — | 5.0 | — | — | — |
| Deotack ® RS | — | — | 5.0 | — | — |
| Novares ® Lab product (example 2) | — | — | — | 5.0 | — |
| Novares ® Lab product (example 4) | — | — | — | — | 5.0 |
| Sulfur | 1.8 | 1.8 | 1.8 | 1.8 | 1.8 |
| Vulkacit ® CZ/CBS | 1.8 | 1.8 | 1.8 | 1.8 | 1.8 |

TABLE 24

Green tack [N] of NR/BR OTR tread after 2 and 8 days

| | M06 | M07 | M08 | DVB-phenol | DCPD-phenol |
|---|---|---|---|---|---|
| 2 days | | | | | |
| | 9.4 | 64.4 | 46.2 | 43.0 | 32.0 |
| | 9.6 | Cannot be separated | 45.6 | 43.4 | 33.0 |
| | 10.2 | | 44.6 | 43.6 | 33.2 |
| | 10.0 | | 45.2 | 52.2 | 33.4 |
| | 10.4 | | 45.0 | 42.8 | 31.6 |
| Average | 9.9 | 64.4 | 45.3 | 45.0 | 32.6 |
| Standard deviation | 0.4 | 0.0 | 0.5 | 3.6 | 0.7 |
| 8 days | | | | | |
| | 11.6 | 51.0 | 59.6 | 46.6 | 29.8 |
| | 11.6 | 51.6 | 59.8 | 47.4 | 30.4 |
| | 12.4 | 52.6 | 59.2 | 48.2 | 30.8 |
| | 12.6 | 53.2 | 59.4 | 48.6 | 31.0 |
| | 11.4 | 52.6 | 58.6 | 48.6 | 31.2 |
| Average | 11.9 | 52.2 | 59.3 | 47.9 | 30.6 |
| Standard deviation | 0.5 | 0.8 | 0.4 | 0.8 | 0.5 |

In table 22, the samples M04 and M05 of the invention show an excellent average green tack after five days, which is as good as the green tack of samples M01 and M02. After eleven days the green tack of sample M04 is nearly the same as after five days. M05 has lost the initial value after 11 days, but still show green tack improvement. The reason of tack change of M05 could be the higher compatibility of the cycloaliphatic backbone in the tested rubber. High compatibility usually promotes the distribution of tackifier in the bulk, reduces the concentration on the rubber interface. The examples M09 and M10 of the invention behave such as M04. The tackifiers of the invention provide the same adhesion intensity as the known tackifier Koresin®. In contrast to Koresin®, the tackifiers of the invention provide the same green tack after two and eight days, whereas the green tack of samples M06, M07 and M08 has changed in this time period.

The invention claimed is:

1. A polymeric tackifier having a number average molar mass ($M_n$) of from 200 to 1,500 g/mol comprising a phenol compound, a linker group L and end group E, wherein said polymeric tackifier comprises 50 wt. % to 70 wt. % phenol compound, 20 wt. % to 50 wt. % of the linker group L, and 5 wt. % to 40 wt. % of the end group E based on the mass of the polymeric tackifier, said low molar mass polymer tackifier having the structure as presented in formula 1 below:

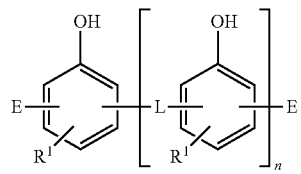

Formula 1 wherein the linker group L has the meaning of

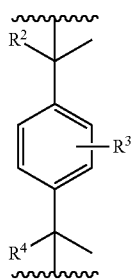

Formula 2 each end group E has the meaning of H or is a group of Formula 2 with only one bond to a phenol compound in formula 1 or has the meaning of

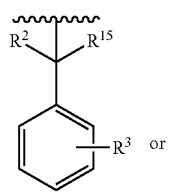

Formula 2c1

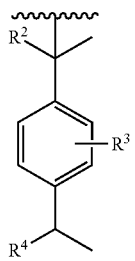

Formula 2c5

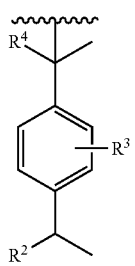

Formula 2c6

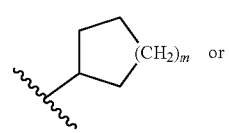

Formula 3c1

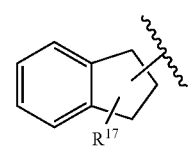

Formula 3c2 and wherein $R^1$ is H, $C_{1-15}$ alkyl, or $C_{1-15}$ oxyalkyl, $R^2$ and $R^4$ are independently from each other H or $C_{1-5}$ alkyl, $R^3$ is OH, $NO_2$, or halogen, $C_{1-5}$ alkyl or $C_{1-5}$ oxyalkyl, $R^{15}$ and $R^{17}$ are independently from each other H or $C^{1-5}$ alkyl, m is an integer from 1 to 7, and n is an integer of from 2 to 21.

2. The polymeric tackifier of claim 1, wherein said polymeric tackifier comprises 10 wt. % to 40 wt. %, of the end group E based on the mass of the polymeric tackifier.

3. The tackifier of claim 1, wherein $R^1$ is H, $C_{1-10}$ alkyl, or $C_{1-10}$ oxyalkyl.

4. The tackifier of claim 1, wherein the end group E has the meaning of

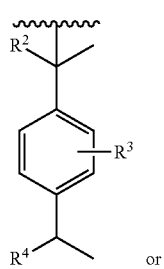

Formula 2c5

Formula 2c6

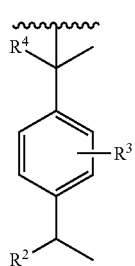

5. The tackifier of claim 1, wherein the OH content is 5 to 13 wt. % based on the mass of the polymeric tackifier.

6. The tackifier of claim 1, wherein the tackifier has a softening point according to ASTM 3461 up to 170° C.

7. The tackifier of claim 1, wherein the $R^{15}$ and $R^{17}$ are independently from each other H or —$CH_3$.

8. The polymeric tackifier of claim 1, wherein said polymeric tackifier comprises 20 wt. % to 50 wt. % of difunctional monomers selected from a divinylbenzene compound, and 5 wt. % to 40 wt. % of a monofunctional monomer having only one bond to a phenol compound in the polymeric tackifier based on the mass of the polymer tackifier.

9. The tackifier of claim 3, wherein $R^1$ is H, $C_{1-8}$ alkyl or $C_{1-8}$ oxyalkyl.

10. The tackifier of claim 3, wherein $R^1$ is H, $C_{1-5}$ alkyl or $C_{1-5}$ oxyalkyl.

11. The tackifier of claim 4, wherein $R^2$, $R^3$, and $R^4$ are H.

12. The tackifier of claim 5, wherein the OH content is 6 to 9 wt. % based on the mass of the polymeric tackifier.

13. The tackifier of claim 6, wherein the tackifier has a softening point according to ASTM 3461 of 40° C. to 120° C.

14. The tackifier of claim 6, wherein the tackifier has a softening point according to ASTM 3461 of 50° C. to 100° C.

* * * * *

UNITED STATES PATENT AND TRADEMARK OFFICE
CERTIFICATE OF CORRECTION

PATENT NO. : 11,873,366 B2  
APPLICATION NO. : 17/797919  
DATED : January 16, 2024  
INVENTOR(S) : Jun Liu et al.

Page 1 of 1

It is certified that error appears in the above-identified patent and that said Letters Patent is hereby corrected as shown below:

In the Claims

Column 28, Line 42, Claim 1, delete "$C^{1-5}$" and insert -- $C_{1-5}$ --

Column 29, Line 10, In Claim 4, after " 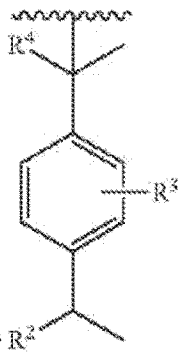 " insert -- . --

Signed and Sealed this  
Fifth Day of March, 2024

Katherine Kelly Vidal  
*Director of the United States Patent and Trademark Office*